(12) United States Patent
Correa, Jr. et al.

(10) Patent No.: US 12,499,513 B2
(45) Date of Patent: Dec. 16, 2025

(54) EFVS INTEGRATED INTERFACE FOR IMAGE DISPLAY CONTROL

(71) Applicant: Rockwell Collins, Inc., Cedar Rapids, IA (US)

(72) Inventors: Ramon Correa, Jr., Newberg, OR (US); Irina R. Sandu, Lake Oswego, OR (US); Geoffrey Cheren, Baker City, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 160 days.

(21) Appl. No.: 18/232,946

(22) Filed: Aug. 11, 2023

(65) Prior Publication Data
US 2025/0054103 A1   Feb. 13, 2025

(51) Int. Cl.
*G06T 5/50* (2006.01)
*B64D 43/00* (2006.01)
(Continued)

(52) U.S. Cl.
CPC ............... *G06T 5/50* (2013.01); *B64D 43/00* (2013.01); *G06T 5/10* (2013.01); *H04N 23/80* (2023.01);
(Continued)

(58) Field of Classification Search
CPC .......... B64D 43/00; G06T 2207/10032; G06T 2207/10048; G06T 2207/20212; G06T 5/10; G06T 5/50; G06T 5/92; G09G 2320/0285; G09G 2320/066; G09G 2320/0673; G09G 2340/10; G09G 2360/144; G09G 2380/12; G09G 3/2007; H04N 23/80; H04N 25/20
See application file for complete search history.

(56) References Cited

U.S. PATENT DOCUMENTS

| 7,961,117 B1 | 6/2011 | Zimmerman et al. |
| 8,384,730 B1 | 2/2013 | VanDerKamp et al. |

(Continued)

FOREIGN PATENT DOCUMENTS

EP   4027298 A1   7/2022

OTHER PUBLICATIONS

Tim Keller, ARINC 818 Avionics Digital Video Bus, The new protocol standard for high performance video systems, Great River Technology, http://www.arinc-818.eu/wp-content/uploads/2017/04/what-is-arinc-818.pdf.

(Continued)

*Primary Examiner* — Peter D Le
(74) *Attorney, Agent, or Firm* — Suiter Swantz IP

(57) ABSTRACT

An enhanced vision system (EVS) is integrated with a heads-up display (HUD). The EVS generates image of an external scene. The EVS generates the images without repeatedly generating the images when a mode of the HUD changes. The EVS includes an expanded interface, where inputs from the HUD are used in the internal processing of the EVS. The HUD then displays information in a graphical and alphanumeric format. The information can include an enhanced vision image from the EVS and/or a synthetic vision image from a synthetic vision system (SVS). The enhanced vision image can be merged with a synthetic vision image to provide a combined vision image.

14 Claims, 6 Drawing Sheets

(51) Int. Cl.
*G06T 5/10* (2006.01)
*H04N 23/80* (2023.01)
*H04N 25/20* (2023.01)

(52) U.S. Cl.
CPC ............... *G06T 2207/10032* (2013.01); *G06T 2207/10048* (2013.01); *G06T 2207/20212* (2013.01); *H04N 25/20* (2023.01)

(56) References Cited

U.S. PATENT DOCUMENTS

| | | | |
|---|---|---|---|
| 8,416,151 | B2 | 4/2013 | Poussin et al. |
| 8,537,214 | B2 | 9/2013 | Poussin et al. |
| 8,681,073 | B1 | 3/2014 | Robbins et al. |
| 9,058,510 | B1 | 6/2015 | Bold et al. |
| 9,726,486 | B1 | 8/2017 | Lahr et al. |
| 9,870,603 | B1 | 1/2018 | Bold et al. |
| 10,109,054 | B1 | 10/2018 | Wilson et al. |
| 10,289,218 | B1 | 5/2019 | Young |
| 10,308,371 | B1 | 6/2019 | Tiana et al. |
| 10,540,007 | B2 | 1/2020 | Tiana et al. |
| 10,657,867 | B1 | 5/2020 | Tiana et al. |
| 10,878,747 | B1* | 12/2020 | Gao .................... G09G 3/3233 |
| 10,928,510 | B1 | 2/2021 | Wood et al. |
| 10,931,938 | B2 | 2/2021 | Hulsey et al. |
| 11,046,452 | B1 | 6/2021 | Viswanatha et al. |
| 11,109,073 | B2 | 8/2021 | Bender |
| 11,120,727 | B2* | 9/2021 | Li ....................... G09G 3/3225 |
| 11,127,371 | B2 | 9/2021 | Keith et al. |
| 11,348,470 | B1 | 5/2022 | Sandu et al. |
| 11,359,931 | B2 | 6/2022 | Barber et al. |
| 11,366,327 | B1 | 6/2022 | Thompson et al. |
| 11,435,580 | B1 | 9/2022 | Sneitzer |
| 11,500,457 | B2 | 11/2022 | Wood et al. |
| 11,562,716 | B2 | 1/2023 | Thompson et al. |
| 11,783,752 | B2* | 10/2023 | Kim ...................... G09G 5/005 345/694 |
| 2002/0011978 | A1* | 1/2002 | Yamazaki ............ G09G 3/3648 345/87 |
| 2005/0052476 | A1* | 3/2005 | Tyrell .................. G09G 3/2092 345/600 |
| 2005/0057484 | A1* | 3/2005 | Diefenbaugh ....... G09G 3/3406 345/102 |
| 2006/0088275 | A1* | 4/2006 | O'Dea ............. H04N 21/42202 386/311 |
| 2007/0052735 | A1* | 3/2007 | Chou ..................... H04N 17/04 348/E17.005 |
| 2007/0216636 | A1* | 9/2007 | Lo ........................ G09G 3/3406 345/102 |
| 2008/0181532 | A1 | 7/2008 | Kim et al. |
| 2008/0204599 | A1* | 8/2008 | Muraki .................... H04N 5/58 348/602 |
| 2009/0237423 | A1* | 9/2009 | Shih ..................... G09G 3/3406 345/102 |
| 2010/0026722 | A1* | 2/2010 | Kondo .................... G09G 5/02 345/660 |
| 2010/0073339 | A1* | 3/2010 | Lee ......................... G09G 3/20 345/207 |
| 2012/0056759 | A1 | 3/2012 | He et al. |
| 2013/0155093 | A1* | 6/2013 | He ....................... G01C 23/005 345/592 |
| 2017/0011692 | A1* | 1/2017 | Lee ...................... G09G 3/3233 |
| 2017/0251501 | A1* | 8/2017 | Batsakes ............... G06F 3/1454 |
| 2018/0352164 | A1* | 12/2018 | Higuchi ............... H04N 9/3155 |
| 2020/0355518 | A1 | 11/2020 | Bilek et al. |
| 2022/0180758 | A1 | 6/2022 | Thompson et al. |

OTHER PUBLICATIONS

European Search Report received in EP Application No. 24188645.6, Jan. 2, 2025, 13 pages.
Oleg Vygolov et al: "Enhanced, Synthetic and Combined Vision Technologies for Civil Aviation", Oct. 31, 2014 (Oct. 31, 2014), Computer Vision in Control Systems-2,, pp. 201-230, XP009191658.

* cited by examiner

200a

200b

200c

EFVS INTEGRATED INTERFACE FOR IMAGE DISPLAY CONTROL

TECHNICAL FIELD

The present invention generally relates to heads-up displays, and more specifically to generating images for the heads-up displays.

BACKGROUND

Heads-up displays receive images from circuitry located onboard an aircraft, for example, from enhanced vision systems and synthetic vision systems. The heads-up displays then apply a transformation to the incoming images based on current settings of the heads-up displays. The HUD then displays the processed images.

Applying the transformation to the incoming images is challenging to perform for the heads-up display, particularly where the heads-up display is made by a separate manufacturer than the enhanced vision systems and synthetic vision systems. Therefore, it would be advantageous to provide a device, system, and method that cures the shortcomings described above.

SUMMARY

An enhanced vision system is described, in accordance with one or more embodiments of the present disclosure. The enhanced vision system includes an image sensor. The image sensor is configured to generate an enhanced image. The enhanced vision system includes a communication interface. The enhanced vision system includes a memory. The memory maintains program instructions. The enhanced vision system includes one or more processors. The one or more processors are configured to execute the program instructions. The program instructions cause the one or more processors to receive, via the communication interface, at least a gamma and a brightness signal. The program instructions cause the one or more processors to generate a lookup table based on the at least the gamma and the brightness signal. The program instructions cause the one or more processors to generate a transformed-enhanced image by applying the lookup table to the enhanced image. The program instructions cause the one or more processors to transmit, via the communication interface, at least one of: the enhanced image and the lookup table; or the transformed-enhanced image.

In some embodiments, the image sensor is an infrared image sensor.

In some embodiments, the program instructions cause the one or more processors to: receive, via the communication interface, the gamma, the brightness signal, and at least one of a contrast signal or an ambient light value; and generate the lookup table based on the gamma, the brightness signal, and at least one of the contrast signal or the ambient light value.

In some embodiments, the program instructions cause the one or more processors to: receive, via the communication interface, at least the gamma, the brightness signal, the contrast signal, and the ambient light value; and generate the lookup table based on the at least the gamma, the brightness signal, the contrast signal, and the ambient light value.

In some embodiments, the program instructions cause the one or more processors to transmit, via the communication interface, the enhanced image, the lookup table, and the transformed-enhanced image.

In some embodiments, the one or more processors generate the lookup table for at least one of an S-curve transform or a piecewise approximation transform.

In some embodiments, applying the lookup table to the enhanced image changes bit values of a plurality of pixels of the enhanced image thereby generating the transformed-enhanced image.

In some embodiments, the transformed-enhanced image is a monochrome image with a plurality of pixels each including gray levels between 0 and 255.

In some embodiments, the program instructions cause the one or more processors to transmit, via the communication interface, statistical data regarding the gray levels.

In some embodiments, the program instructions cause the one or more processors to transmit, via the communication interface, the transformed-enhanced image as uncompressed digital video.

In some embodiments, the program instructions cause the one or more processors to transmit, via the communication interface, the transformed-enhanced image using an ARINC A818 protocol.

An aircraft is described, in accordance with one or more embodiments of the present disclosure. The aircraft includes a heads-up display. The aircraft includes an enhanced vision system. The heads-up display and the enhanced vision system are communicatively coupled. The enhanced vision system includes an image sensor. The image sensor is configured to generate an enhanced image. The enhanced vision system includes a communication interface. The enhanced vision system includes a memory. The memory maintains program instructions. The enhanced vision system includes one or more processors. The one or more processors are configured to execute the program instructions. The program instructions cause the one or more processors to receive, from the heads-up display via the communication interface, at least a gamma and a brightness signal. The program instructions cause the one or more processors to generate a lookup table based on the at least the gamma and the brightness signal. The program instructions cause the one or more processors to generate a transformed-enhanced image by applying the lookup table to the enhanced image. The program instructions cause the one or more processors to transmit, to the heads-up display via the communication interface, at least one of: the enhanced image and the lookup table; or the transformed-enhanced image.

In some embodiments, the heads-up display is configured to display the transformed-enhanced image in response to receiving the transformed-enhanced image.

In some embodiments, the aircraft includes a synthetic vision system. The synthetic vision system is configured to generate a synthetic image. The heads-up display is configured to receive the synthetic image from the synthetic vision system. The heads-up display is configured to combine the transformed-enhanced image and the synthetic image to generate a combined image.

In some embodiments the heads-up display is configured to: receive the enhanced image and the lookup table; apply a linear scaling factor to the lookup table; generate the transformed-enhanced image by applying the lookup table to the enhanced image in response to applying the linear scaling factor; and combine the transformed-enhanced image and the synthetic image to generate the combined image.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
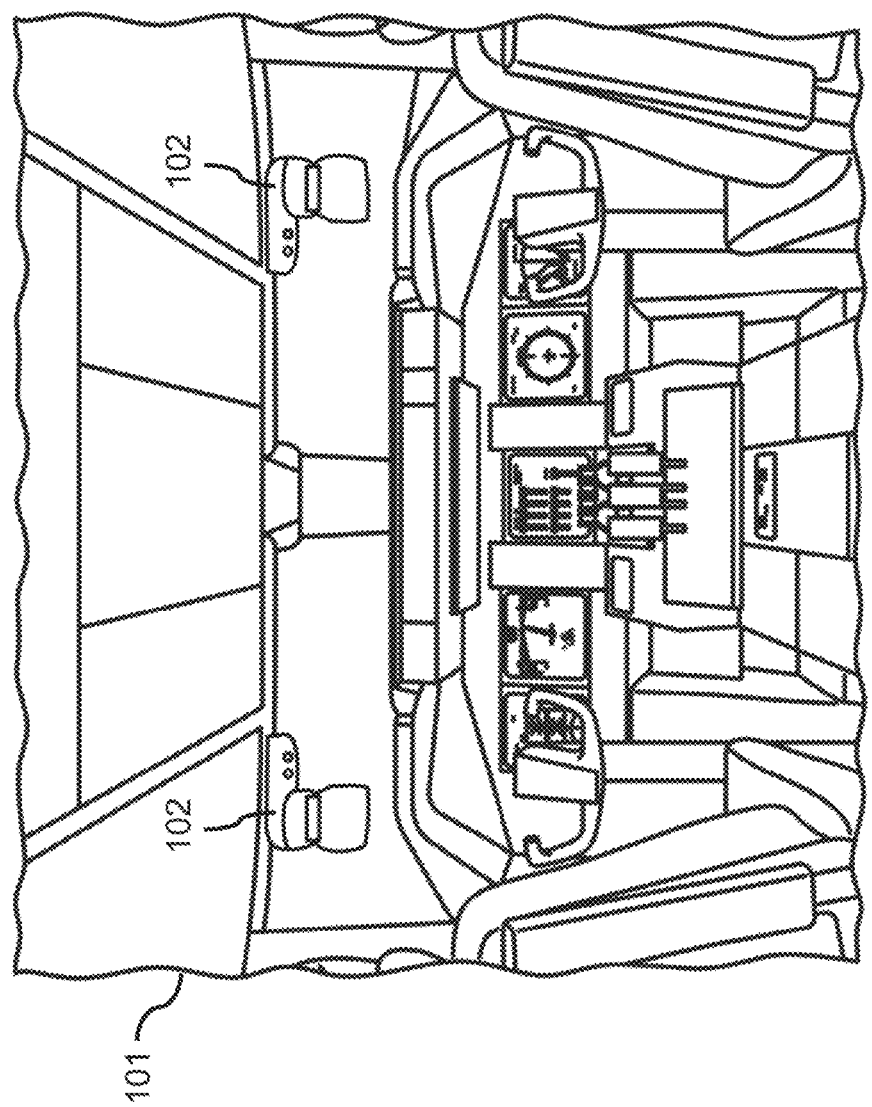
FIG. 1A depicts a view of a cockpit of an aircraft including a heads-up display, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to an enhanced flight vison system (EFVS) with an integrated interface for image display control. The EFVS may also be referred to as an enhanced vision system (EVS). The EVS is integrated with a heads-up display (HUD). The EVS generates image of an external scene. The EVS generates the images without repeatedly generating the images when a mode of the HUD changes. The EVS includes an expanded interface, where inputs from the HUD are used in the internal processing of the EVS. The HUD then displays information in a graphical and alphanumeric format. The information can include an enhanced vision image from the EVS and/or a synthetic vision image from a synthetic vision system (SVS). The enhanced vision image can be merged with a synthetic vision image to provide a combined vision image.

U.S. Pat. No. 11,348,470, titled "Apparent video brightness control and metric"; U.S. Pat. No. 10,928,510, titled "System for and method of image processing for low visibility landing applications"; U.S. Pat. No. 11,435,580, titled "High dynamic range head-up display"; U.S. Pat. No. 10,657,867, titled "Image control system and method for translucent and non-translucent displays"; U.S. Pat. No. 8,384,730, titled "System, module, and method for generating HUD image data from synthetic vision system image data"; U.S. Pat. No. 11,127,371, titled "Extending brightness dimming range of displays via image frame manipulation"; U.S. Pat. No. 10,308,371, titled "Spatially modulated and temporally sequenced multi-stream vision system"; U.S. Pat. No. 9,058,510, titled "System for and method of controlling display characteristics including brightness and contrast"; U.S. Pat. No. 8,681,073, titled "System for and method of controlling contrast or color contrast in see-through displays"; U.S. Pat. No. 11,046,452, titled "Head-up display including supplemental indicator"; are each incorporated herein by reference in the entirety.

Figure 1B:
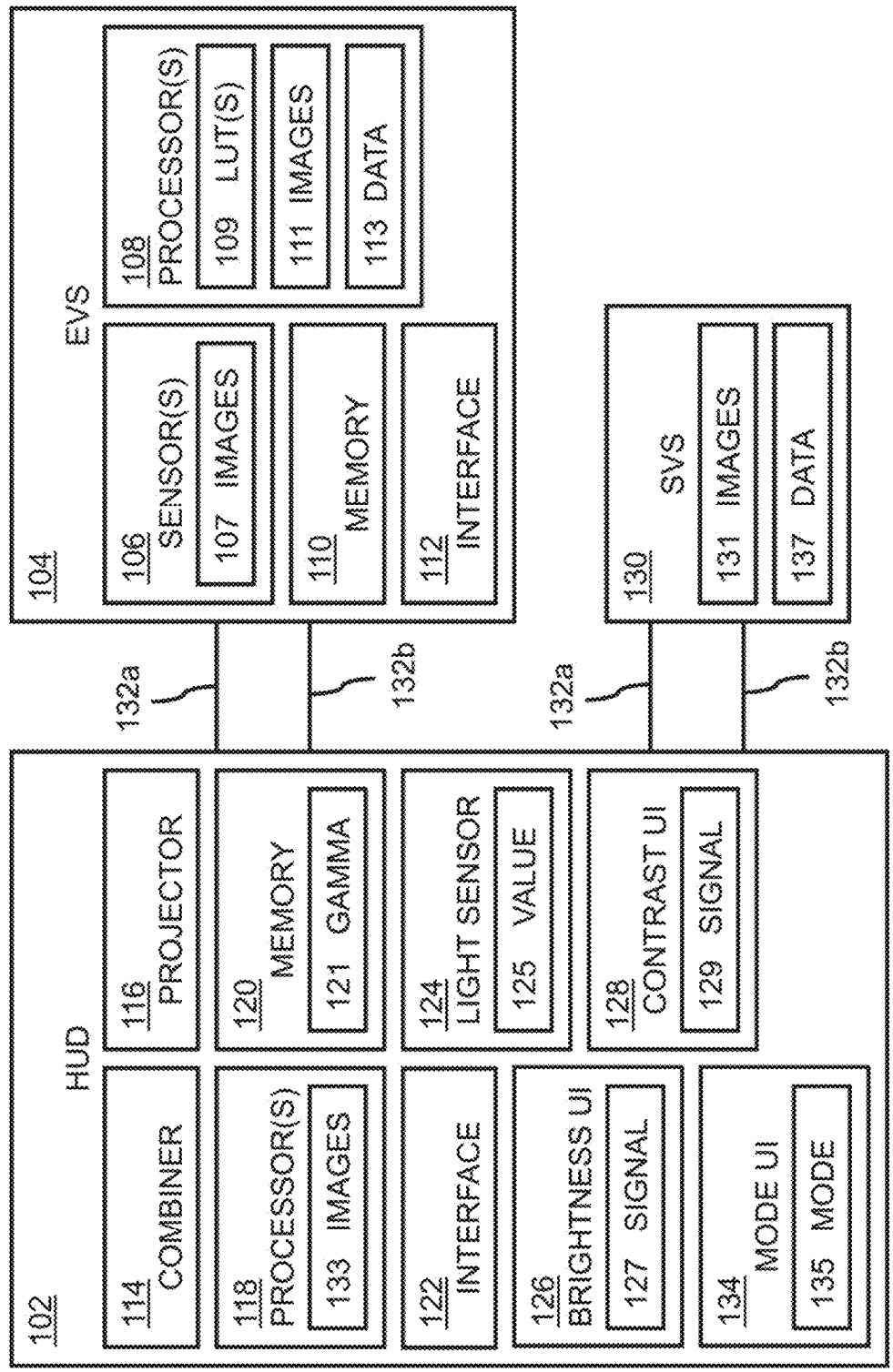
FIG. 1B depicts a block diagram of an aircraft, in accordance with one or more embodiments of the present disclosure.

Referring now to FIGS. 1A-1B, an aircraft 100 is described, in accordance with one or more embodiments of the present disclosure. The aircraft 100 includes a cockpit 101. The aircraft 100 also includes heads-up displays (HUD) 102, enhanced vision system (EVS) 104, synthetic vision system (SVS) 130, buses 132, and the like. The HUD 102 is disposed within the cockpit 101.

The aircraft 100 includes the HUD 102. The HUD 102 present flight data. The flight data may include video streams of the EVS 104, SVS 130, and/or a combined video stream. The video stream guides the pilots in limited-visibility environments (e.g., when instrument flight rules are in effect). The video stream includes images from EVS 104, SVS 130, and/or a combined vision system (CVS). The HUD 102 displays data that appears as an overlay to the pilot's field of view. The HUD 102 includes one or more of a combiner 114, image projector 116, processors 118, memory 120, communication interface 122, light sensor 124, brightness user interface 126, contrast user interface 128, and the like.

The HUD 102 includes the combiner 114. The combiner 114 may include refractive combiners, waveguide combiners, or the like. The combiner 114 is a transparent, semi-reflective surface. For example, the combiner 114 may be substantially transparent or partially transparent. Ambient light from the windshield passes through the combiner 114. The combiner 114 reflects light from the image projector 116. In this way, the combiner 114 displays both images from the image projector 116 and the actual environment through the windshield. A pilot may view the outside world while simultaneously viewing the images reflected by the combiner 114.

The HUD 102 includes the image projector 116. The image projector 116 may include light-emitting diode (LED) projectors, cathode-ray tube projectors, or the like. The image projector 116 projects images on the combiner 114. The HUD 102 may display an image by causing the image projector 116 to project the image on the combiner 114. The images may also be referred to as frames. The image projector 116 is configured to display images with a plurality of pixels. Each of the pixels includes a gray scale level. For example, the gray scale level may be a value from 0-255. Each of the pixels may then be stored as a byte or an 8-bit integer. The image projector 116 is configured to display a plurality of the images in a video stream.

The HUD 102 includes one or more of the processors 118 and the memory 120. The memory 120 maintains program instructions. The one or more processors 118 are configured to execute the program instructions. The program instructions cause the one or more processors 118 to carry out one or more steps of the present disclosure.

The memory 120 includes a gamma 121. The gamma 121 may also be referred to as gamma value, gamma correction factor, gamma correction parameter, display gamma characteristics, or the like. The gamma 121 described how smoothly black transitions to white on the HUD 102. In particular, the gamma 121 indicates the amount of gamma compression or gamma expansion performed by the HUD 102. The gamma 121 is based on one or more characteristics of the HUD 102, such as, but not limited to, a voltage and a luminance of the image projector 116. The gamma 121 is a rational number. The gamma 121 may include any rational number. Typically, the gamma 121 is between 1 and 3. For example, the HUD 102 may include a gamma 121 of 1.8, 2.0, 2.2, 2.4, 2.6 or the like.

The HUD 102 includes one or more of the light sensors 124. The light sensor 124 may also be referred to as an ambient light sensor 124. The light sensor 124 can be a photonic device for sensing light conditions in the cockpit 101. For example, the one or more light sensors 124 may include at least one of a photoresistor, a photodiode, a phototransistor, a photocell, a photovoltaic light sensor, a photo diode, a light-dependent sensor, and the like. The one or more light sensors 124 may be configured to generate an ambient light value 125. The ambient light value 125 is associated with the ambient light in the cockpit 101.

The HUD 102 includes the brightness user interface 126 and/or contrast user interface 128. The brightness user interface 126 generates a brightness signal 127. The brightness signal 127 is indicative of a level of brightness of the HUD 102. The contrast user interface 128 generates a contrast signal 129. The contrast signal 129 is indicative of a level of contrast of the HUD 102. The brightness user interface 126 and the contrast user interface 128 are used to control the brightness and contrast of the HUD 102, respectively. In particular, the brightness user interface 126 and the contrast user interface 128 controls the brightness and contrast, respectively, of LUT 109 and/or transformed-enhanced images 111 received from the EVS 104. The brightness signal 127 and contrast signal 129 are percentage signals. The signals may be standardized to a percentage (e.g., 0% to 100%). The brightness user interface 126 and/or contrast user interface 128 can be a knob, dial, sliding mechanism, joystick, switch, lever, button, or any other type of analog or digital user interface capable of producing brightness signal 127 and contrast signal 129, respectively. For example, the brightness user interface 126 and/or contrast user interface 128 may include a concentric dual knob.

The aircraft 100 includes an enhanced vision system (EVS) 104. The EVS 104 provides a plug and play solution for optimizing the video displayed by the HUD 102. The EVS 104 includes one or more image sensors 106, processors 108, memory 110, communication interface 112, and the like. In some embodiments, one or more components of the EVS 104 are embodied as a line-replaceable unit. The EVS 104 can include any electronic system or device for providing a sensed image of the external scene topography.

The EVS 104 includes the image sensors 106. The image sensors 106 are positioned aboard the aircraft 100. For example, the image sensors 106 may be mounted on the exterior of the aircraft 100. The image sensors 106 collect electromagnetic radiation from the environment surrounding the aircraft 100. The image sensors 106 generate enhanced images 107 based on the electromagnetic radiation. The enhanced images 107 are monochrome images with pixels each including gray levels between 0 and 255.

The image sensors 106 may detect electromagnetic radiation from one or more bands. For example, the image sensors 106 may include visible-band image sensors which detect electromagnetic radiation in the visible band. By way of another example, the image sensors 106 may include electromagnetic sensors associated with spectral bands outside the visible band. For instance, the image sensors associated with spectral bands outside the visible band may include infrared (IR) image sensors (e.g., near-infrared (NIR), short-wave infrared (SWIR), medium-wave infrared (MWIR), long-wave infrared (LWIR)), and the like. The image sensors associated with spectral bands outside the visible band provide enhanced visibility in a degraded visual environment (DVE) when the visible-band sensors are hindered by one or more conditions. For example, the one or more conditions may include darkness, smoke, haze, or humidity. In some embodiments, the image sensors 106 are infrared image sensors. The enhanced images 107 may be considered enhanced, by expanding the bands wavelengths visible to pilots.

The EVS 104 includes one or more of the processors 108 and the memory 110. The memory 110 maintains program instructions. The one or more processors 108 are configured to execute the program instructions. The program instructions cause the one or more processors 108 to carry out one or more steps of the present disclosure.

The processors 108 receive the enhanced images 107 from the electromagnetic sensors 106. The processors 108 also receive the gamma 121, the brightness signal 127, and/or the contrast signal 129. For example, the processors 108 receive the gamma 121, the brightness signal 127, and/or the contrast signal 129 from the HUD 102 via the communication interface 112.

The processors 108 process the enhanced images 107 to generate LUT 109 and/or transformed-enhanced images 111. In some embodiments, the EVS 104 generates the LUT 109 and/or transformed-enhanced images 111 for every frame displayed by the HUD 102. The EVS 104 generates the LUT 109 and/or transformed-enhanced images 111 at a frame rate. For example, the frame rate may include 24 frames-per-second (FPS), 30 FPS, or the like.

In some embodiments, the processors 108 generate one or more of the lookup tables (LUT) 109. The LUT 109 may also be referred to as a HUD optimal display LUT. Determining the LUT 109 is relatively computationally intensive. Therefore, using the EVS 104 to determine the LUT 109 may be desirable for offloading processing requirements for the HUD 102.

The LUT 109 map input gray levels of the enhanced images 107 to output gray levels of the transformed-enhanced images 111. The LUT 109 individually or zonally adjusts pixel brightness (e.g., darker, or brighter) and contrast. The LUT 109 is used to translate input gray levels to generate output gray levels. The enhanced images 107 and the transformed-enhanced images 111 are monochrome images with pixels each including gray levels between 0 and 255. Applying the LUT 109 to the enhanced images 111 changes the bit values of the pixels of the enhanced images 107 thereby generating the transformed-enhanced images 111.

In some embodiments, the processors 108 may generate the LUT 109 for S-curve transforms, piecewise approximation transforms, and the like. In some embodiments, the processors 108 generate the LUT 109 using a sigmoid transfer function, or the like.

In some embodiments, the processors 108 generate the transformed-enhanced images 111. The transformed-enhanced images 111 may also be referred to as compensated images. The transformed-enhanced images 111 are monochrome images with pixels each including gray levels between 0 and 255. The processors 108 generate the transformed-enhanced images 111 by applying the LUT 109 to the enhanced images 107. The processors 108 transforms the gray levels of the pixels from the enhanced images 107 using the LUT 109 to generate the gray levels of the pixels for the transformed-enhanced images 111. The gray levels of the pixels for the transformed-enhanced images 111 are distributed in a different way than the gray levels of the pixels for the enhanced images 107.

The processors 108 process the enhanced images 107 to generate LUT 109 and/or transformed-enhanced images 111 based on the gamma 121, the brightness signal 127, the contrast signal 129, and/or the ambient light value 125. In this regard, the LUT 109 and the images 107 are compensated for various settings of the HUD 102 and/or the ambient settings of the cockpit 101. In some embodiments, the processors 108 process the enhanced images 107 to generate LUT 109 and/or transformed-enhanced images 111 based on the gamma 121 and the brightness signal 127. For example, the HUD 102 may not include the contrast user interface 128. In some embodiments, the processors 108 process the enhanced images 107 to generate LUT 109 and/or transformed-enhanced images 111 based on the gamma 121, the brightness signal 127, and the contrast signal 129. The EVS 104 may also generate the LUT 109 based on the ambient light value 125. The LUT 109 produces higher brightness levels when the ambient light value 125 indicates the cockpit 101 is in a high ambient light condition and lower brightness levels when the ambient light value 125 indicates the cockpit 101 is in a low ambient light condition. The EVS 104 may also adjust the transformed-enhanced images 111 based on the ambient light value 125. Thus, the EVS 104 uses the display characteristics of the HUD 102, the HUD control knobs, and optionally the ambient light sensor to generate the lookup table and/or compensate the output.

In some embodiments, the processors 108 generate statistical data 113 of the transformed-enhanced images 111. The statistical data 113 may include statistical data regarding the gray levels of the transformed-enhanced images 111. For example, the statistical data 113 may include a mean gray level, standard deviation of the gray levels, and the like.

The EVS 104 includes the communication interface 112 and the HUD 102 includes the communication interface 122. The EVS 104 and the HUD 102 communicate via the communication interface 112 and the communication interface 122, respectively. In some embodiments, the EVS 104 and the HUD 102 communicate using one or more handshake protocols.

In some embodiments, the aircraft 100 includes one or more buses 132 connecting the EVS 104 and the HUD 102. The one or more buses 132 may include may include a wired interface, such as, but not limited to, a copper pair, fiber, or the like. The communication interface 112 and the communication interface 122 may interface with the one or more buses 132.

The EVS 104 and the HUD 102 may communicate using one or more communication protocols. The communication protocols may include ARINC A429, ARING A818, and the like. A429 is a data transfer standard for aircraft avionics. A818 is a video interface and protocol standard. In some embodiments, the HUD 102 and the EVS 104 communicate using the ARINC A429 protocol. For example, the aircraft 100 may include one or more buses 132a. The buses 132a may be referred to as A429 interface buses, where the communication protocol is the A429. In some embodiments, the EVS 104 transmits images to the HUD 102 using the ARINC A818 protocol. In some embodiments, the aircraft 100 may include one or more buses 132b. The buses 132b may be referred to as A818 interface buses, where the communication protocol is the A818. In some embodiments, the aircraft 100 includes A429 interface buses 132a and A818 interface buses 132b, which are each between the HUD 102 and the EVS 104. In some embodiments, the aircraft 100 includes multiple (not depicted) of the A818 interface buses 132b between the HUD 102 and the EVS 104, where one of the A818 interface buses 132b is for transmitting the enhanced images 107 and another of the A818 interface buses 132b is for transmitting the transformed-enhanced images 111.

The HUD 102 may transmit the gamma 121, the ambient light value 125, the brightness signal 127, and/or the contrast signal 129 to the EVS 104. The EVS 104 receives the gamma 121, the ambient light value 125, the brightness signal 127, and/or the contrast signal 129. For example, the processors 108 may cause the communication interface 112 to receive the enhanced images 107, the LUT 109, the transformed-enhanced images 111, and/or the statistical data 113. In some embodiments, the EVS 104 receives one or more packets encoded using A419 protocol, the packets including the gamma 121, the ambient light value 125, the brightness signal 127, and/or the contrast signal 129. The processors 108 may then decode the packets.

The EVS 104 may transmit the enhanced images 107, LUT 109, the transformed-enhanced images 111, and/or the statistical data 113. For example, the processors 108 may cause the communication interface 112 to transmit the enhanced images 107, the LUT 109, the transformed-enhanced images 111, and/or the statistical data 113. The HUD 102 receives the enhanced images 107, LUT 109, the transformed-enhanced images 111, and/or the statistical data 113.

In some embodiments, the EVS 104 may transmit the enhanced images 107 and/or the transformed-enhanced images 111 as uncompressed digital video. For example, the enhanced images 107 and/or the transformed-enhanced images 111 may be transmitted in one or more ARINC A818 frames. The images may be part of the video line of the A818 frames.

In some embodiments, the processors 108 transmit the LUT 109 and/or the statistical data 113 with the enhanced images 107 and/or the transformed-enhanced images 111. For example, the LUT 109 and/or the statistical data 113 may be transmitted in one or more ARINC A818 frames. The LUT 109 and/or the statistical data 113 may be part of the ancillary data of the A818 frames. The ancillary data is part of a fiber channel header in the A818 frames. The ancillary data is a location in the A818 protocol format where ancillary data may be inserted. The LUT 109 and/or the statistical data 113 may occupy any number of bytes in the ancillary data. For example, the LUT 109 may be 256 bytes of the ancillary data. It is contemplated that the statistical data 113 may be fewer bytes than the LUT 109.

In some embodiments, the EVS 104 always generates the LUT 109 and/or the transformed-enhanced images 111. In some embodiments, the EVS 104 generates the LUT 109 and/or the transformed-enhanced images 111 in response to receiving a command from the HUD 102. The HUD 102 may command the EVS 104 to output the LUT 109 and/or the transformed-enhanced images 111. For example, the HUD 102 may command the EVS 104 via the A429 interface bus 132a.

In some embodiments, the aircraft 100 includes the SVS 130. In some embodiments, the SVS 130 includes one or more processors, memory, communication interface, and the like. The SVS 130 is database driven. The SVS 130 may include one or more databases. The databases may include a terrain database, obstacle database, hydrological database, and the like.

The SVS 130 generates synthetic images 131. The synthetic images 131 are synthetic renderings of a three-dimensional perspective scene in front of the aircraft 100. The synthetic images 131 synthetically depicts the geography surrounding the aircraft 100. The synthetic images 131 include iconography, symbology, and other synthetic representations (synthetic images) of objects or features within the environment. The synthetic images 131 generated by the SVS 130 may indicate or highlight terrain features (e.g., flat land, bodies of water, mountains, and rock formations) which may be differentiated from each other (and from the sky) via colorization. The synthetic images 131 generated by the SVS 130 may indicate or highlight airport or airfield features such as runways and runway zones (threshold, touchdown), airfield structures or towers, airfield lighting systems (runway, approach, taxi), IFR beacons and markers, and VFR waypoints. The synthetic images 131 may include symbols and data (e.g., classifiers for the identification of objects, terrain, speed, and altitude data, and the like).

The synthetic images 131 are relevant to the environment surrounding the aircraft 101 based on the determined position of the aircraft 100. For example, the SVS 130 may generate the synthetic images 131 based on a position of the aircraft 100. The SVS 130 may receive the position via an onboard GPS receiver (or similar satellite-based absolute position receiver) of the aircraft 100. By way of another example, the SVS 130 may receive the position via position data collected by gyroscopes, accelerometers, or similar inertial measurement units (IMU) of the aircraft 100. In this example, the position data may be further processed by other flight systems aboard the aircraft 100 to assess a relative position of the aircraft 100. The SVS 130 may cross-reference the determined position of the aircraft 100 with obstacle, terrain, and other navigational databases to generate the synthetic images 131.

In some embodiments, the SVS 130 generates the statistical data 137. The statistical data 137 represents one or more properties of the synthetic images 131. The statistical data 137 may include statistical data regarding the gray levels of the synthetic images 131. For example, the statistical data 137 may include a mean gray level, standard deviation of the gray levels, and the like.

The SVS 130 transmits the synthetic images 131 and/or the statistical data 137 to the HUD 102. For example, the SVS 130 and the HUD 102 may be communicatively coupled by one or more of the buses 132 (e.g., A429 buses 132a, A818 buses 132b).

In some embodiments, the HUD 102 is configured to receive one or more images. For example, the HUD 102 may receive the enhanced images 107 and/or transformed-enhanced images 111 from the EVS 104. By way of another example, the HUD 102 may receive the synthetic images 131 from the SVS 130. In some embodiments, the HUD 102 is configured to receive the LUT 109 from the EVS 104. The HUD 102 is configured to display one or more images. For example, the HUD 102 may display the transformed-enhanced images 111, the synthetic images 131, and/or combined images 133.

In some embodiments, the HUD 102 may include a mode user interface 134. The mode user interface 134. The mode user interface 134 controls a display mode 135 of the HUD 102. The display mode 135 includes an EVS display mode, a SVS display mode, and a combined vision system (CVS) display mode. The CVS display mode is a combination of the EVS display mode and the SVS display mode. The HUD 102 displays the transformed-enhanced images 111 in the EVS display mode. The HUD 102 displays the synthetic images 131 in the SVS display mode. The HUD 102 generates and displays combined images 133 in the CVS display mode.

The HUD 102 may choose between displaying the transformed-enhanced images 111 in response to receiving the transformed-enhanced images 111 from the EVS 104 and using the LUT 109 to generate the transformed-enhanced images 111. In some embodiments, the HUD 102 may display the transformed-enhanced images 111 in response to receiving the transformed-enhanced images 111 from the EVS 104, without the HUD 102 compensating for the gamma 121, ambient light value 125, brightness signal 127, and/or contrast signal 129. Thus, the processing resources of the HUD 102 may be conserved. Although the HUD 102 is described as displaying the transformed-enhanced images 111 in response to receiving the transformed-enhanced images 111, this is not intended as a limitation of the present disclosure. In some embodiments, the HUD 102 receives the enhanced images 107 and the LUT 109. The HUD 102 may apply the LUT 109 to the enhanced images 107 to generate the transformed-enhanced images 111. The HUD 102 may then display the transformed-enhanced images 111 in response to applying the LUT 109 to the enhanced images 107 to generate the transformed-enhanced images 111. In this regard, the HUD 102 may display the transformed-enhanced images 111 without having to generate the LUT

109. The HUD 102 also has flexibility to adjust the LUT 109 before applying the LUT 109 to the enhanced images 107.

In some embodiments, the HUD 102 generates combined images 133. The processors 118 of the HUD 102 generate the combined images 133. The HUD 102 combines the transformed-enhanced images 111 and the synthetic images 131 to generate the combined images 133. The HUD may combine the images using a fusion processing algorithm. The fusion process may include formatting (positioning, sizing, cropping, etc.) of the transformed-enhanced images 111 and/or the synthetic images 131. The synthetic images 131 are overlaid on the transformed-enhanced images 111.

The combined images 133 includes video content and symbology content. For example, symbology content may include altitude, flight speed, navigation information or other aircraft data. By way of another example, the combined images 133 may display navigational or guidance data overlayed onto a runway that the flight crew is viewing. The images may also be overlayed onto a view of terrain, other aircraft, cloud cover, low visibility conditions, other hazards, etc.

In some embodiments, the HUD 102 standardizes the transformed-enhanced images 111 and the combined images 133 based on the synthetic images 131. The LUT 109 may be nominal for the EVS display mode. In some embodiments, the HUD 102 applies a linear scaling factor to the LUT 109. Applying the linear scaling factor to the LUT 109 is relatively computationally easy compared to the EVS generating the LUT 109. The HUD 102 applies a linear scaling factor to the LUT 109 when the EVS display mode and the CVS display mode are selected. The linear scale factor may adjust a gain of the LUT 109 to reduce the discrepancy between the half-on pixel in the transformed-enhanced images 111, the synthetic images 131, and the combined images 133. The transformed-enhanced images 111, the synthetic images 131, and the combined images 133 then achieve a consistent brightness/contrast. In this regard, the LUT 109 assists the HUD 102 in performing integration to scale the transformed-enhanced images 111 and the combined images 133.

The scaling factor may be based on the statistical data 113 received from the EVS 104 and statistical data 137 received from the SVS 130. The HUD 102 compares the statistical data 113 of the transformed-enhanced images 111 with the statistical data 137 of the synthetic images 131 to determine the scaling factor. For example, the scaling factor may be a ratio of the statistical data 113 over statistical data 137 of the synthetic images 131. For instance, the transformed-enhanced images 111 has an average brightness/contrast. The synthetic images 131 has an average brightness/contrast. The scaling factor is a ratio of the average brightness/contrast of the transformed-enhanced images 111 and the synthetic images 131. The HUD 102 scales the LUT before applying the LUT 109 to the images 107 to generate (i.e., regenerate) the transformed-enhanced images 111. The transformed-enhanced images 111 are then combined with the synthetic images 131 to achieve consistent brightness and contrast.

Figure 2A:
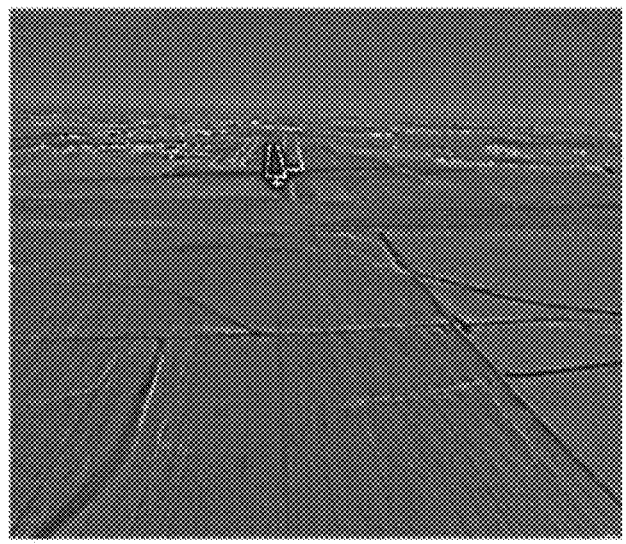
FIG. 2A depicts an enhanced image, in accordance with one or more embodiments of the present disclosure.
Figure 2B:
FIG. 2B depicts a transformed-enhanced image for a low brightness signal, in accordance with one or more embodiments of the present disclosure.
Figure 2C:
FIG. 2C depicts a transformed-enhanced image for a high brightness signal, in accordance with one or more embodiments of the present disclosure.

Referring now to FIGS. 2A-2C, example images 200 are described, in accordance with one or more embodiments of the present disclosure. The images 200 are monochrome images with a plurality of pixels each including gray levels between 0 and 255. The number of the pixels is based on a resolution of the image projector 116, and is not intended to be limited to the number of pixels depicted. For example, FIG. 2A depicts an image 200a. The image 200a is an example of the enhanced image 107. By way of another example, FIG. 2B depicts an image 200b. The image 200b is an example of the transformed-enhanced image 111 which is transformed by applying the LUT 109 to the image 200a, where the LUT 109 is generated from the brightness signal 127 which is low. In this regard, the image 200b is darker than the image 200a. By way of another example, FIG. 2C depicts an image 200c. The image 200c is an example of the transformed-enhanced image 111 which is transformed by applying the LUT 109 to the image 200a, where the LUT 109 is generated from the brightness signal 127 which is high. In this regard, the image 200c is brighter than the image 200a.

Figure 3A:
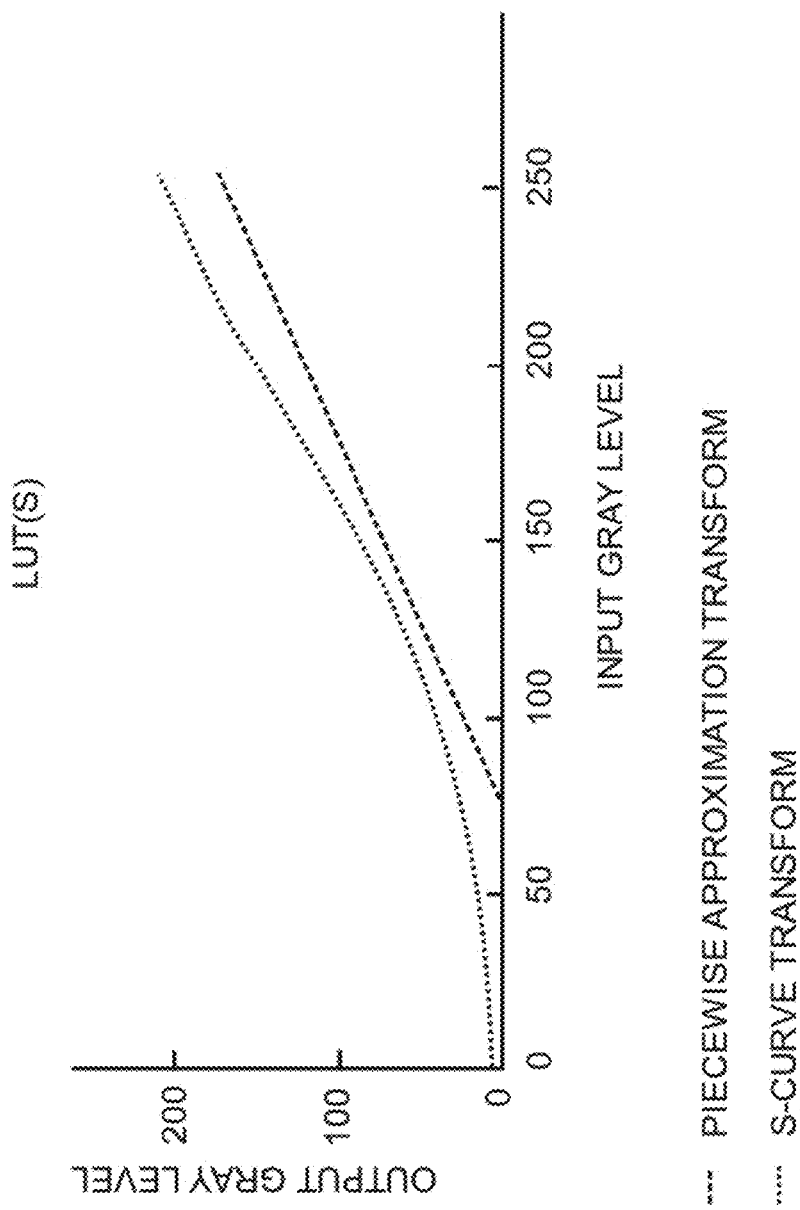
FIG. 3A depicts lookup tables for a low brightness signal, in accordance with one or more embodiments of the present disclosure.
Figure 3B:
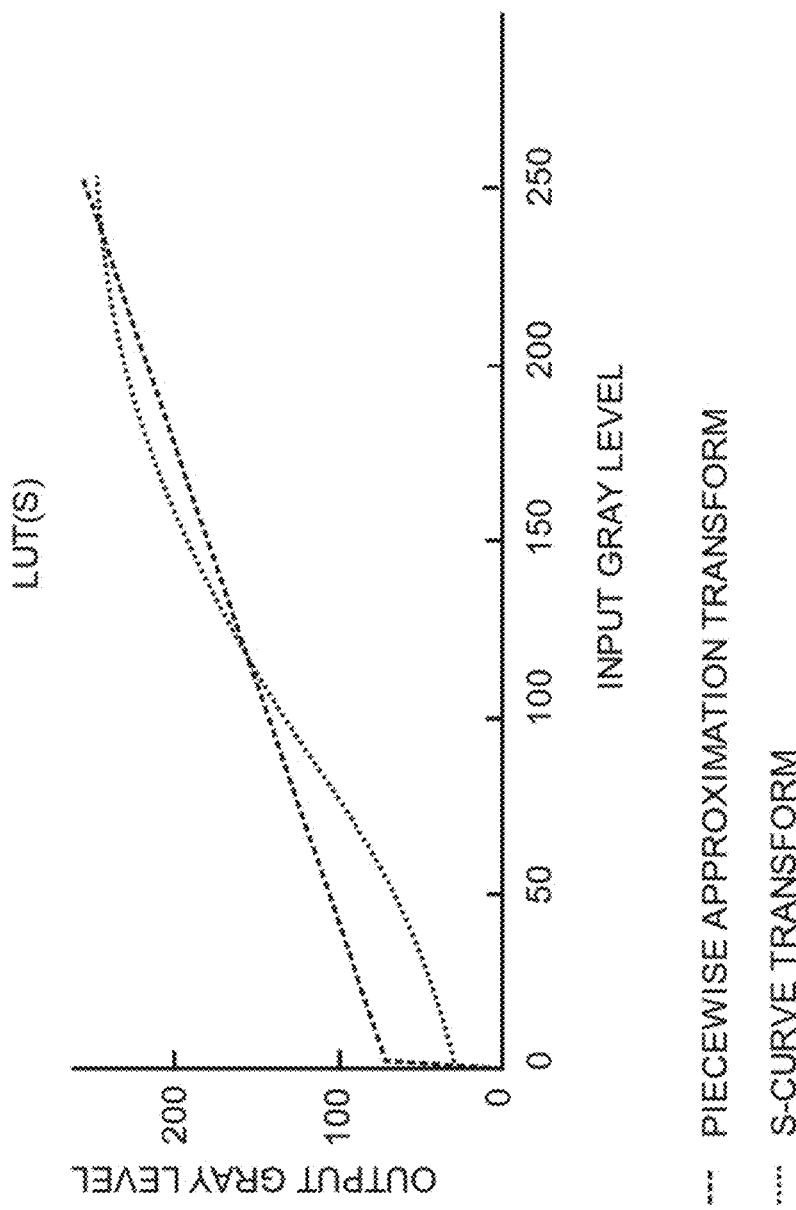
FIG. 3B depicts lookup tables for a high brightness signal, in accordance with one or more embodiments of the present disclosure.

Referring now to FIGS. 3A-3B, exemplary LUTs 300 are described, in accordance with one or more embodiments of the present disclosure. The LUTs 300 are examples of the LUT 109. The horizontal axis denotes an input gray level (e.g., from 0-255) for the pixels of the enhanced images 107. The vertical axis denotes an output gray level (e.g., from 0-255) for the pixels of the transformed-enhanced images 111. For example, FIG. 3A depicts LUTs 300a for a piecewise approximation transform and an S-curve transform when the brightness signal 127 is low. By way of another example, FIG. 3B depicts LUTs 300b for a piecewise approximation transform and an S-curve transform when the brightness signal 127 is high. The LUTs 300a map the output gray levels to lower values, as compared to the LUTs 300b.

Referring generally again to FIGS. 1A-3B. In some embodiments, the EVS 104 may generate transformed-enhanced images 111 of the surrounding environment by adding flight data to the enhanced images 107. The flight data may include, for example, terrain awareness data, horizon orientation data, speed data, altitude data, vertical speed data, compass data, etc. that may assist and guide a pilot during the takeoff and landing phases of a flight.

It is noted that the various HUDs and EVS may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

In some embodiments, the LUT 109 is generated using a sigmoid transfer function. A transform derived from the statistical properties of a darker input frame may produce a brighter output, and vice versa. The output frame may appear normalized from an apparent brightness perspective, as dark images are brightened and, conversely, bright images are darkened. The output frame may have its histogram stretched and normalized to produce an equalized look between the two frames. Additionally, a brightness knob may adjust the center of the sigmoid transform to produce a brighter or darker stream (e.g., for low knob levels the output frame may be darker, while for high knob levels the output frame may be brighter).

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An enhanced vision system comprising:
    an image sensor; wherein the image sensor is configured to generate an enhanced image;
    a communication interface;
    a memory; wherein the memory maintains program instructions; and
    one or more processors; wherein the one or more processors are configured to execute the program instructions; wherein the program instructions cause the one or more processors to:
        receive, from a heads-up display via the communication interface, at least a gamma and a brightness signal;
        generate a lookup table based on the at least the gamma and the brightness signal;
        generate a transformed-enhanced image by applying the lookup table to the enhanced image, wherein the transformed-enhanced image is a monochrome image with a plurality of pixels each including gray levels; and
        transmit, to the heads-up display via the communication interface:
            the enhanced image and the lookup table;
            the transformed-enhanced image, wherein the enhanced image and the transformed-enhanced image are transmitted as uncompressed digital video; and
            statistical data regarding the gray levels, wherein the lookup table and the statistical data are transmitted with the enhanced image.

2. The enhanced vision system of claim 1, wherein the image sensor is an infrared image sensor.

3. The enhanced vision system of claim 1, wherein the program instructions cause the one or more processors to:
    receive, via the communication interface, the gamma, the brightness signal, and at least one of a contrast signal or an ambient light value; and
    generate the lookup table based on the gamma, the brightness signal, and at least one of the contrast signal or the ambient light value.

4. The enhanced vision system of claim 3, wherein the program instructions cause the one or more processors to:
    receive, via the communication interface, at least the gamma, the brightness signal, the contrast signal, and the ambient light value; and
    generate the lookup table based on the at least the gamma, the brightness signal, the contrast signal, and the ambient light value.

5. The enhanced vision system of claim 1, wherein the one or more processors generate the lookup table for at least one of an S-curve transform or a piecewise approximation transform.

6. The enhanced vision system of claim 1, wherein applying the lookup table to the enhanced image changes bit values of a plurality of pixels of the enhanced image thereby generating the transformed-enhanced image.

7. The enhanced vision system of claim 1, wherein the gray levels are between 0 and 255.

8. The enhanced vision system of claim 1, wherein the program instructions cause the one or more processors to transmit, via the communication interface, the enhanced image, the transformed-enhanced image, the lookup table, and the statistical data using an ARINC A818 protocol, wherein the lookup table and the statistical data are transmitted as part of an ancillary data in the ARINC A818 protocol.

9. The enhanced vision system of claim 1, wherein the statistical data regarding the gray levels is at least one of a mean gray level or a standard deviation of the gray levels.

10. An aircraft comprising:
    a heads-up display; and
    an enhanced vision system; wherein the heads-up display and the enhanced vision system are communicatively coupled; wherein the enhanced vision system comprises:
        an image sensor; wherein the image sensor is configured to generate an enhanced image;
        a communication interface;
        a memory; wherein the memory maintains program instructions; and
        one or more processors; wherein the one or more processors are configured to execute the program instructions; wherein the program instructions cause the one or more processors to:
            receive, from the heads-up display via the communication interface, at least a gamma and a brightness signal;
            generate a lookup table based on the at least the gamma and the brightness signal;

generate a transformed-enhanced image by applying the lookup table to the enhanced image, wherein the transformed-enhanced image is a monochrome image with a plurality of pixels each including gray levels; and transmit, to the heads-up display via the communication interface:
   the enhanced image and the lookup table;
   the transformed-enhanced image, wherein the enhanced image and the transformed-enhanced image are transmitted as uncompressed digital video; and
   statistical data regarding the gray levels, wherein the lookup table and the statistical data are transmitted with the enhanced image.

11. The aircraft of claim 10, wherein the heads-up display is configured to display the transformed-enhanced image in response to receiving the transformed-enhanced image.

12. The aircraft of claim 10, comprising a synthetic vision system; wherein the synthetic vision system is configured to generate a synthetic image; wherein the heads-up display is configured to receive the synthetic image from the synthetic vision system; wherein the heads-up display is configured to combine the transformed-enhanced image and the synthetic image to generate a combined image.

13. The aircraft of claim 12, wherein the heads-up display is configured to:
   receive the enhanced image and the lookup table;
   apply a linear scaling factor to the lookup table, wherein the scaling factor is based on the statistical data received from the enhanced vision system and statistical data received from the synthetic vision system;
   generate the transformed-enhanced image by applying the lookup table to the enhanced image in response to applying the linear scaling factor; and
   combine the transformed-enhanced image and the synthetic image to generate the combined image.

14. The aircraft of claim 13, wherein the linear scaling factor is a ratio of the statistical data received from the enhanced vision system over the statistical data received from the synthetic vision system.

\* \* \* \* \*